(12) United States Patent
Li et al.

(10) Patent No.: US 10,768,826 B2
(45) Date of Patent: Sep. 8, 2020

(54) DISK DETECTION METHOD AND APPARATUS

(71) Applicant: HUAWEI TECHNOLOGIES CO., LTD., Shenzhen (CN)

(72) Inventors: Jinghui Li, Shenzhen (CN); Jindong Zhang, Shenzhen (CN); Cheng Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 242 days.

(21) Appl. No.: 15/883,029

(22) Filed: Jan. 29, 2018

(65) Prior Publication Data

US 2018/0150239 A1 May 31, 2018

Related U.S. Application Data

(63) Continuation of application No. PCT/CN2016/080376, filed on Apr. 27, 2016.

(30) Foreign Application Priority Data

Jul. 31, 2015 (CN) .......................... 2015 1 0465856

(51) Int. Cl.
*G06F 3/06* (2006.01)
*G06F 11/30* (2006.01)
(Continued)

(52) U.S. Cl.
CPC .......... *G06F 3/0611* (2013.01); *G06F 3/0653* (2013.01); *G06F 3/0689* (2013.01);
(Continued)

(58) Field of Classification Search
None
See application file for complete search history.

(56) References Cited

U.S. PATENT DOCUMENTS 7,707,148 B1 * 4/2010 Fogel ................... G06K 9/6223
707/999.007
8,467,281 B1 6/2013 Colon et al.
(Continued)

FOREIGN PATENT DOCUMENTS

CN 101533366 A 9/2009
CN 102147708 A 8/2011
(Continued)

*Primary Examiner* — Reginald G Bragdon
*Assistant Examiner* — James J. Thomas
(74) *Attorney, Agent, or Firm* — Kilpatrick Townsend & Stockton LLP (57) ABSTRACT

The present invention provides a disk detection method and apparatus. The method includes: collecting a set of N pieces of real-time data that are in a one-to-one correspondence with N input/output I/O-related counters of a disk, where the N I/O-related counters include an I/O response time of the disk and a counter affecting the I/O response time; the I/O response time is a time between delivery of an operation request by an application and reception of a response of the disk to the request; determining, according to the N pieces of real-time data, whether the I/O response time is abnormal; and outputting a detection result if the I/O response time is abnormal, where the detection result is used to represent that the I/O response time is abnormal.

4 Claims, 3 Drawing Sheets

(51) Int. Cl.
*G06F 11/34* (2006.01)
*G06F 11/22* (2006.01)

(52) U.S. Cl.
CPC .......... *G06F 11/22* (2013.01); *G06F 11/3034* (2013.01); *G06F 11/3419* (2013.01); *G06F 11/3485* (2013.01)

(56) References Cited

U.S. PATENT DOCUMENTS

| | | |
|---|---|---|
| 9,037,826 B1 | 5/2015 | Brooker et al. |
| 2002/0138610 A1 | 9/2002 | Miyazawa et al. |
| 2002/0188697 A1 | 12/2002 | O'Connor |
| 2006/0106926 A1* | 5/2006 | Kato .................. G06F 11/3419 709/223 |
| 2008/0010531 A1* | 1/2008 | Hendler ............. G05B 23/0281 714/33 |
| 2013/0238941 A1* | 9/2013 | Ando .................. G06F 11/0757 714/42 |
| 2014/0052841 A1* | 2/2014 | Kanemasa ............ G06F 9/5083 709/224 |

FOREIGN PATENT DOCUMENTS

| | | |
|---|---|---|
| CN | 103488544 A | 1/2014 |
| CN | 103761180 A | 4/2014 |
| CN | 103810062 A | 5/2014 |

\* cited by examiner

DISK DETECTION METHOD AND APPARATUS

CROSS-REFERENCE TO RELATED APPLICATIONS

This application is a continuation of International Application No. PCT/CN2016/080376, filed on Apr. 27, 2016, which claims priority to Chinese Patent Application No. 201510465856.0, filed on Jul. 31, 2015. The disclosures of the aforementioned applications are hereby incorporated by reference in their entireties.

TECHNICAL FIELD

The present invention relates to the field of electronic technologies, and in particular, to a disk detection method and apparatus.

BACKGROUND

A response time of a disk for an input/output (Input/Output, I/O for short) request becomes longer because of magnetic degradation, a bad sector, vibration, or another mechanical or environmental problem of the disk. This type of disk that is extremely slow in responding to an I/O request is referred to as a slow disk.

The slow disk is a major threat to reliability of a storage system. Particularly, for a redundant array of independent disks (Redundant Arrays of IndependentDisks, RAID for short) and a distributed storage system, a slowdown of one disk may cause performance degradation of a total system, and even cause service interruption in a severe case. Therefore, the disk needs to be detected, so as to take a corresponding processing measure in a timely manner, for example, to isolate the slow disk and perform data backup.

SUMMARY

Embodiments of the present invention provide a disk detection method and apparatus, so as to detect whether a slow disk occurs.

A first aspect of the present invention provides a disk detection method, including:

collecting a set of N pieces of real-time data that are in a one-to-one correspondence with N input/output I/O-related counters of a disk, where the N I/O-related counters include an I/O response time of the disk and a counter affecting the I/O response time; the I/O response time is a time between delivery of an operation request by an application and reception of a response of the disk to the request; and N is an integer greater than or equal to 2;

determining, according to the N pieces of real-time data, whether the I/O response time is abnormal, where the I/O response time being abnormal indicates that the disk is incapable of normally running a service, and the I/O response time being normal indicates that the disk is capable of normally running a service; and outputting a detection result if the I/O response time is abnormal, where the detection result represents that the I/O response time is abnormal.

With reference to the first aspect, in a first possible implementation manner of the first aspect, the determining, according to the N pieces of real-time data, whether the I/O response time is abnormal includes:

determining which preset interval, of at least two preset intervals of each I/O-related counter of remaining N−1 I/O-related counters other than the I/O response time, that each of N−1 pieces of real-time data corresponding to the remaining N−1 I/O-related counters is in, where the N−1 pieces of real-time data corresponding to the remaining N−1 I/O-related counters are respectively in N−1 preset intervals, and the at least two preset intervals of each I/O-related counter of the N−1 I/O-related counters are at least two subinterval ranges obtained by dividing a large range between a first value and a second value that each I/O-related counter is capable of supporting;

determining whether real-time data corresponding to the I/O response time exceeds an I/O response time threshold corresponding to a combination of the N−1 preset intervals, where the I/O response time threshold is less than or equal to: when the N−1 pieces of real-time data are in respective preset intervals, a maximum I/O response time value that enables the disk to normally run the service; and if the real-time data corresponding to the I/O response time exceeds the I/O response time threshold, determining that the I/O response time is abnormal.

With reference to the first aspect, in a second possible implementation manner of the first aspect, the determining, according to the N pieces of real-time data, whether the I/O response time is abnormal includes:

using the N pieces of real-time data as a data point in an N-dimensional coordinate system, where N dimensions in the N-dimensional coordinate system are in a one-to-one correspondence with the N I/O-related counters;

determining whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; and if the first distance is greater than the predetermined distance, determining that the I/O response time is abnormal.

With reference to the first aspect, in a third possible implementation manner of the first aspect, the determining, according to the N pieces of real-time data, whether the I/O response time is abnormal includes:

using the N pieces of real-time data as a data point in an N-dimensional coordinate system, where N dimensions in the N-dimensional coordinate system are in a one-to-one correspondence with the N I/O-related counters;

determining whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range;

determining whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range; and if the first distance is greater than the predetermined distance and the real-time data corresponding to the I/O response time exceeds the preset I/O response time threshold, determining that the I/O response time is abnormal.

With reference to the first aspect, in a fourth possible implementation manner of the first aspect, the determining, according to the N pieces of real-time data, whether the I/O response time is abnormal includes:

using the N pieces of real-time data as a data point in an N-dimensional coordinate system, where N dimensions in the N-dimensional coordinate system are in a one-to-one correspondence with the N I/O-related counters;

determining whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range;

determining whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance and the real-time data corresponding to the counter that represents a load magnitude is in the preset load range, determining that the I/O response time is abnormal.

With reference to the first aspect, in a fifth possible implementation manner of the first aspect, the determining, according to the N pieces of real-time data, whether the I/O response time is abnormal includes:

using the N pieces of real-time data as a data point in an N-dimensional coordinate system, where N dimensions in the N-dimensional coordinate system are in a one-to-one correspondence with the N I/O-related counters;

determining whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range;

determining whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range;

determining whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance, the real-time data corresponding to the I/O response time exceeds the preset I/O response time threshold, and the real-time data corresponding to the counter that represents a load magnitude is in the preset load range, determining that the I/O response time is abnormal.

A second aspect of the present invention provides a disk detection apparatus, including:

a data collection unit, configured to collect a set of N pieces of real-time data that are in a one-to-one correspondence with N input/output I/O-related counters of a disk, where the N I/O-related counters include an I/O response time of the disk and a counter affecting the I/O response time; the I/O response time is a time between delivery of an operation request by an application and reception of a response of the disk to the request; and N is an integer greater than or equal to 2; and a processing unit, configured to determine, according to the N pieces of real-time data, whether the I/O response time is abnormal, where the I/O response time being abnormal indicates that the disk is incapable of normally running a service, and the I/O response time being normal indicates that the disk is capable of normally running a service; and output a detection result if the I/O response time is abnormal, where the detection result represents that the I/O response time is abnormal.

With reference to the second aspect, in a first possible implementation manner of the second aspect, the processing unit is configured to determine which preset interval, of at least two preset intervals of each I/O-related counter of remaining N−1 I/O-related counters other than the I/O response time, that each of N−1 pieces of real-time data corresponding to the remaining N−1 I/O-related counters is in, where the N−1 pieces of real-time data corresponding to the remaining N−1 I/O-related counters are respectively in N−1 preset intervals, and the at least two preset intervals of each I/O-related counter of the N−1 I/O-related counters are at least two subinterval ranges obtained by dividing a large range between a first value and a second value that each I/O-related counter is capable of supporting;

determine whether real-time data corresponding to the I/O response time exceeds an I/O response time threshold corresponding to a combination of the N−1 preset intervals, where the I/O response time threshold is less than or equal to: when the N−1 pieces of real-time data are in respective preset intervals, a maximum I/O response time value that enables the disk to normally run the service; and if the real-time data corresponding to the I/O response time exceeds the I/O response time threshold, determine that the I/O response time is abnormal.

With reference to the second aspect, in a second possible implementation manner of the second aspect, the processing unit is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; and if the first distance is greater than the predetermined distance, determine that the I/O response time is abnormal.

With reference to the second aspect, in a third possible implementation manner of the second aspect, the processing unit is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; determine whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range; and if the first distance is greater than the predetermined distance and the real-time data corresponding to the I/O response time exceeds the preset I/O response time threshold, determine that the I/O response time is abnormal.

With reference to the second aspect, in a fourth possible implementation manner of the second aspect, the processing unit is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; determine whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance and the real-time data corresponding to the counter that represents a load magnitude is in the preset load range, determine that the I/O response time is abnormal.

With reference to the second aspect, in a fifth possible implementation manner of the second aspect, the processing unit is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; determine whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range; determine whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance, the real-time data corresponding to the I/O response time exceeds the preset I/O response time threshold, and the real-time data corresponding to the counter that represents a load magnitude is in the preset load range, determine that the I/O response time is abnormal.

A third aspect of the present invention provides an electronic device, including:

a memory, configured to store data used by a processor; and the processor, configured to collect a set of N pieces of real-time data that are in a one-to-one correspondence with N input/output I/O-related counters of a disk, where the N I/O-related counters include an I/O response time of the disk and a counter affecting the I/O response time; the I/O response time is a time between delivery of an operation request by an application and reception of a response of the disk to the request; and N is an integer greater than or equal to 2, where the processor is further configured to determine, according to the N pieces of real-time data, whether the I/O response time is abnormal, where the I/O response time being abnormal indicates that the disk is incapable of normally running a service, and the I/O response time being normal indicates that the disk is capable of normally running a service; and output a detection result if the I/O response time is abnormal, where the detection result represents that the I/O response time is abnormal.

With reference to the third aspect, in a first possible implementation manner of the third aspect, the processor is configured to determine which preset interval, of at least two preset intervals of each I/O-related counter of remaining N−1 I/O-related counters other than the I/O response time, that each of N−1 pieces of real-time data corresponding to the remaining N−1 I/O-related counters is in, where the N−1 pieces of real-time data corresponding to the remaining N−1 I/O-related counters are respectively in N−1 preset intervals, and the at least two preset intervals of each I/O-related counter of the N−1 I/O-related counters are at least two subinterval ranges obtained by dividing a large range between a first value and a second value that each I/O-related counter is capable of supporting;

determine whether real-time data corresponding to the I/O response time exceeds an I/O response time threshold corresponding to a combination of the N−1 preset intervals, where the I/O response time threshold is less than or equal to: when the N−1 pieces of real-time data are in respective preset intervals, a maximum I/O response time value that enables the disk to normally run the service; and if the real-time data corresponding to the I/O response time exceeds the I/O response time threshold, determine that the I/O response time is abnormal.

With reference to the third aspect, in a second possible implementation manner of the third aspect, the processor is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; and if the first distance is greater than the predetermined distance, determine that the I/O response time is abnormal.

With reference to the third aspect, in a third possible implementation manner of the third aspect, the processor is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; determine whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range; and if the first distance is greater than the predetermined distance and the real-time data corresponding to the I/O response time exceeds the preset I/O response time threshold, determine that the I/O response time is abnormal.

With reference to the third aspect, in a fourth possible implementation manner of the third aspect, the processor is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range;

determine whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance and the real-time data corresponding to the counter that represents a load magnitude is in the preset load range, determine that the I/O response time is abnormal.

With reference to the third aspect, in a fifth possible implementation manner of the third aspect, the processor is configured to use the N pieces of real-time data as a data point in an N-dimensional coordinate system, where N dimensions in the N-dimensional coordinate system are in a one-to-one correspondence with the N I/O-related counters;

determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range;

determine whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range;

determine whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance, the real-time data corresponding to the I/O response time exceeds the preset I/O response time threshold, and the real-time data corresponding to the counter that represents a load magnitude is in the preset load range, determine that the I/O response time is abnormal.

A fourth aspect of the present invention provides a disk system, including:

a disk; and a disk controller, configured to collect a set of N pieces of real-time data that are in a one-to-one correspondence with N input/output I/O-related counters of the disk, where the N I/O-related counters include an I/O response time of the disk and a counter affecting the I/O response time; the I/O response time is a time between delivery of an operation request by an application and reception of a response of the disk to the request; and N is an integer greater than or equal to 2, where the disk controller is further configured to determine, according to the N pieces of real-time data, whether the I/O response time is abnormal, where the I/O response time being abnormal indicates that the disk is incapable of normally running a service, and the I/O response time being normal indicates that the disk is capable of normally running a service; and output a detection result if the I/O response time is abnormal, where the detection result represents that the I/O response time is abnormal.

With reference to the fourth aspect, in a first possible implementation manner of the fourth aspect, the disk controller is configured to determine which preset interval, of at least two preset intervals of each I/O-related counter of remaining N−1 I/O-related counters other than the I/O response time, that each of N−1 pieces of real-time data corresponding to the remaining N−1 I/O-related counters is in, where the N−1 pieces of real-time data corresponding to the remaining N−1 I/O-related counters are respectively in N−1 preset intervals, and the at least two preset intervals of each I/O-related counter of the N−1 I/O-related counters are at least two subinterval ranges obtained by dividing a large range between a first value and a second value that each I/O-related counter is capable of supporting;

determine whether real-time data corresponding to the I/O response time exceeds an I/O response time threshold corresponding to a combination of the N−1 preset intervals, where the I/O response time threshold is less than or equal to: when the N−1 pieces of real-time data are in respective preset intervals, a maximum I/O response time value that enables the disk to normally run the service; and if the real-time data corresponding to the I/O response time exceeds the I/O response time threshold, determine that the I/O response time is abnormal.

With reference to the fourth aspect, in a second possible implementation manner of the fourth aspect, the disk controller is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; and if the first distance is greater than the predetermined distance, determine that the I/O response time is abnormal.

With reference to the fourth aspect, in a third possible implementation manner of the fourth aspect, the disk controller is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; determine whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range; and if the first distance is greater than the predetermined distance and the real-time data corresponding to the I/O response time exceeds the preset I/O response time threshold, determine that the I/O response time is abnormal.

With reference to the fourth aspect, in a fourth possible implementation manner of the fourth aspect, the disk controller is configured to use the N pieces of real-time data as a data point in an N-dimensional coordinate system, where N dimensions in the N-dimensional coordinate system are in a one-to-one correspondence with the N I/O-related counters;

determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range;

determine whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance and the real-time data corresponding to the counter that represents a load magnitude is in the preset load range, determine that the I/O response time is abnormal.

With reference to the fourth aspect, in a fifth possible implementation manner of the fourth aspect, the disk controller is configured to use the N pieces of real-time data as a data point in an N-dimensional coordinate system, where N dimensions in the N-dimensional coordinate system are in a one-to-one correspondence with the N I/O-related counters;

determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range;

determine whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range;

determine whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance, the real-time data corresponding to the I/O response time exceeds the preset I/O response time threshold, and the real-time data corresponding to the counter that represents a load magnitude is in the preset load range, determine that the I/O response time is abnormal.

A fifth aspect of the present invention provides an electronic device, including:

the disk system described in any one of the fourth aspect to the fifth possible implementation manner of the fourth aspect; and a processor, configured to read and write data in the disk.

The one or more technical solutions provided in the embodiments of the present invention have at least the following technical effects or advantages:

In the embodiments of the present invention, real-time data of an I/O response time of a disk and real-time data of a counter affecting the I/O response time are collected, and then whether the I/O response time is abnormal is determined according to real-time data of multiple counters, so as to detect whether a slow disk occurs. Further, according to the embodiments of the present invention, whether the I/O response time is abnormal is determined by further referring to another I/O counter affecting the I/O response time, and therefore is closer to an actual situation. Therefore, a detection result of the method in the embodiments of the present invention is relatively accurate, thereby reducing false negatives and false positives.

DESCRIPTION OF EMBODIMENTS

Embodiments of the present invention provide a disk detection method and apparatus, so as to detect whether a slow disk occurs.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
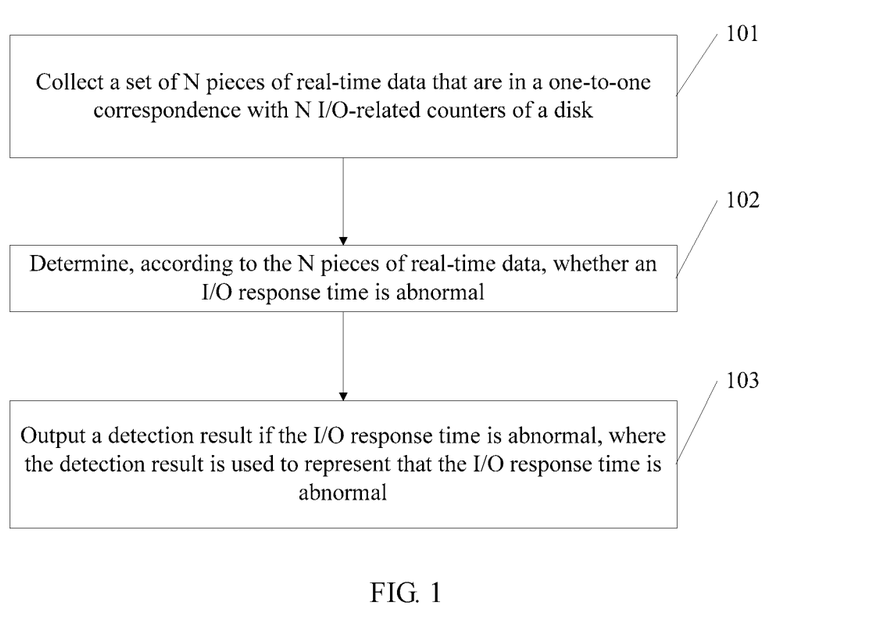
FIG. 1 is a flowchart of a disk detection method according to an embodiment of the present invention.

Referring to FIG. 1, FIG. 1 is a flowchart of a disk detection method according to an embodiment of the present invention. As shown in FIG. 1, the method includes the following content.

Step 101: Collect a set of N pieces of real-time data that are in a one-to-one correspondence with N I/O-related counters of a disk, where the N I/O-related counters include an I/O response time of the disk and a counter affecting the I/O response time; the I/O response time is a time between delivery of an operation request by an application and reception of a response of the disk to the request; and N is an integer greater than or equal to 2.

Step 102: Determine, according to the N pieces of real-time data, whether the I/O response time is abnormal, where the I/O response time being abnormal indicates that the disk is incapable of normally running a service, and the I/O response time being normal indicates that the disk is capable of normally running a service.

Step 103: Output a detection result if the I/O response time is abnormal, where the detection result represents that the I/O response time is abnormal.

The I/O-related counter affecting the I/O response time is, for example, a counter reflecting a situation such as an I/O quantity or an I/O magnitude. The N I/O-related counters are, for example, at least two counters of counters monitored by an iostat tool: a quantity of read requests merged per second in a queue (rrqm/s), a quantity of write requests merged per second in a queue (wrqm/s), a quantity of read requests issued per second (r/s), a quantity of write requests issued per second (w/s), a quantity of sectors read per second (rsec/s), a quantity of sectors written per second (wsec/s), an average size of requests (avgrq-sz), an average queue length of requests (avgqu-sz), an average time for requests to be served (await), an average service time of requests (svctm), or device utilization (util).

Specifically, a value of N may be set according to an actual situation, and may be usually set by referring to calculation performance of a device that executes the method shown in FIG. 1.

In practical use, step 101 to step 103 may be performed periodically. For example, the steps may be set to be performed every three seconds. Certainly, it is understandable that, step 101 to step 103 may also be performed according to a time point set by a user, for example, may be performed at 00:00 every day. Step 101 to step 103 may also be performed according to a trigger operation entered by a user.

Specifically, the data of the N I/O-related counters may be simultaneously collected at each collection moment. For example, data of r/s and data of rsec/s are simultaneously collected at a first moment.

After a set of N pieces of real-time data is collected in a collection period in no matter which collection manner, step 102 is performed next, that is, whether the I/O response time is abnormal is determined according to the N pieces of real-time data. In a specific implementation process, there are multiple specific implementation manners of step 102, and the following describes the implementation manners in detail.

In a first possible implementation manner, step 102 includes: determining which preset interval, of at least two preset intervals of each I/O-related counter of remaining N−1 I/O-related counters other than the I/O response time, that each of N−1 pieces of real-time data corresponding to the remaining N−1 I/O-related counters is in, where the N−1 pieces of real-time data corresponding to the remaining N−1 I/O-related counters are respectively in N−1 preset intervals, and the at least two preset intervals of each I/O-related counter of the N−1 I/O-related counters are at least two subinterval ranges obtained by dividing a large range between a first value and a second value that each I/O-related counter is capable of supporting; determining whether real-time data corresponding to the I/O response time exceeds an I/O response time threshold corresponding to a combination of the N−1 preset intervals, where the I/O response time threshold is less than or equal to: when the N−1 pieces of real-time data are in respective preset intervals, a maximum I/O response time value that enables the disk to normally run the service; and if the real-time data corresponding to the I/O response time exceeds the I/O response time threshold, determining that the I/O response time is abnormal.

Specifically, for the remaining N−1 I/O-related counters, a large range between a first value and a second value that each I/O-related counter is capable of supporting is divided into at least two subinterval ranges. For example, the N−1 counters include a counter 1 and a counter 2. A large range of the counter 1 is divided into three subinterval ranges, which are respectively three preset intervals, for example, a preset interval 1, a preset interval 2, and a preset interval 3. Similarly, a large range of the counter 2 is divided into three subinterval ranges, which are respectively three preset intervals, also referred to as a preset interval 1, a preset interval 2, and a preset interval 3. Refer to Table 1 for details.

TABLE 1

|  | Preset interval 1 of the counter 1 | Preset interval 2 of the counter 1 | Preset interval 3 of the counter 1 |
|---|---|---|---|
| Preset interval 1 of the counter 2 | I/O response time threshold 1 | I/O response time threshold 2 | I/O response time threshold 3 |
| Preset interval 2 of the counter 2 | I/O response time threshold 4 | I/O response time threshold 5 | I/O response time threshold 6 |
| Preset interval 3 of the counter 2 | I/O response time threshold 7 | I/O response time threshold 8 | I/O response time threshold 9 |

An I/O response time threshold corresponding to a combination of preset intervals of each counter is less than or equal to: when the N−1 pieces of real-time data are in respective preset intervals, a maximum I/O response time value that enables the disk to normally run the service. For example, when the counter 1 is in the preset interval 1, and the counter 2 is in the preset interval 3, a corresponding I/O response time threshold is the I/O response time threshold 7. The I/O response time threshold 7 is less than or equal to: when the counter 1 is in the preset interval 1 and the counter 2 is in the preset interval 3, a maximum value that enables the disk to normally run the service.

Therefore, when real-time data of the counter 1 and real-time data of the counter 2 are collected, which preset interval of the counter 1 the real-time data of the counter 1 is in and which preset interval of the counter 2 the real-time data of the counter 2 is in are determined according to the real-time data corresponding to the counter 1 and the real-time data corresponding to the counter 2. Assuming that a determining result is that the real-time data of the counter 1 is in the preset interval 3 of the counter 1 and that the real-time data of the counter 2 is in the preset interval 2 of the counter 2, a corresponding I/O response time threshold is the I/O response time threshold 6.

Next, the real-time data, collected in step 101, of the I/O response time is compared with the I/O response time threshold, and if the real-time data corresponding to the I/O response time exceeds the I/O response time threshold 6, the I/O response time is abnormal.

In practical use, Table 1 may further be replaced by another form, for example, a form shown in Table 2.

TABLE 2

| Affecting counter 1 | Affecting counter 2 | ... | Affecting counter k | ... | Affecting counter N − 1 | Response time threshold |
|---|---|---|---|---|---|---|
| Medium | High |  | Medium |  | Low | High |
| Low | High |  | Medium |  | Low | High |

In this example, each preset interval of an affecting counter corresponds to a grade, for example, preset intervals are divided into three grades: high, medium, and low. An I/O response time threshold corresponding to a combination of grades of each affecting counter is also a grade, and a meaning of the I/O response time threshold is the same as that described above.

It can be learned from the foregoing description that, in the first possible implementation manner, whether the I/O response time is abnormal is determined by comprehensively considering impacts of the other N−1 counters on the I/O response time. Compared with a determining result obtained by considering only the I/O response time, a determining result of the method in this embodiment is more accurate.

In a second possible implementation manner, step 102 includes: using the N pieces of real-time data as a data point in an N-dimensional coordinate system, where N dimensions in the N-dimensional coordinate system are in a one-to-one correspondence with the N I/O-related counters; determining whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range;

and if the first distance is greater than the predetermined distance, determining that the I/O response time is abnormal.

Specifically, before step 101, the M N-dimensional data points corresponding to the N I/O-related counters of the disk are collected. Specifically, M times of sampling are performed on the N I/O-related counters, and a set of N pieces of data corresponding to the N I/O-related counters are collected in each time of sampling. In practical use, the data of the N I/O-related counters may be simultaneously collected at each sampling moment. For example, data of r/s and data of rsec/s are simultaneously collected at a first sampling moment. If the N I/O-related counters are in a one-to-one correspondence with the N dimensions in the N-dimensional coordinate system, N pieces of data collected in each time of sampling correspond to one N-dimensional data point in the N-dimensional coordinate system. Therefore, the M N-dimensional data points corresponding to the N I/O-related counters are obtained after the M times of sampling.

Specifically, in an ideal condition, the M N-dimensional data points are collected during normal running of the disk. For example, when a new disk is just mounted in a system, because the disk is not yet used in this case, the disk is relatively close to a normal state in the ideal condition. Therefore, benchmark data may be collected in this case. However, in practical use, disks are not new in many cases, but already run in a system for a period of time. Compared with a new disk, a disk that runs for a period of time may be already worn from a hardware perspective; and therefore already deviates from the normal state in the ideal condition to some extent. In this case, whether the disk is normally running may be manually determined with reference to a running condition of a service carried on the disk. If the disk normally runs and is not obviously slowed down, the benchmark data may be collected.

Specifically, M is an integer greater than or equal to 1. A value of M may be set according to an actual situation, and may be usually set by referring to the calculation performance of the device that executes the method shown in FIG. 1.

After the M N-dimensional data points corresponding to the N I/O-related counters are collected, the collected M N-dimensional data points may be processed next. In practical use, there are multiple specific processing manners, such as a clustering algorithm and a function fitting method. All the manners support automatic learning by a system without manual setting, and may be self-adaptive to different environment configurations and service scenarios.

In this embodiment, a clustering algorithm is used as an example for description. The present invention sets no limitation on using which clustering algorithm, for example, a k-means algorithm or a K-Medoids algorithm can be used. Because an algorithm principle of each clustering algorithm is well known by a person skilled in the art, an analyzing process of each algorithm is not described in detail, but for ease of understanding invention content of the present invention, the following briefly describes how to use a clustering algorithm to perform clustering analysis on the M N-dimensional data points.

Specifically, in a possible implementation manner, the clustering center is obtained by performing clustering processing on the M N-dimensional data points.

For example, each related counter of the N I/O-related counters may correspond to one dimension in the N-dimensional coordinate system. M pieces of data of each related counter are coordinate values in a corresponding dimension. For ease of description, assuming that N is 2, the N-dimensional coordinate system may be a two-dimensional rectangular coordinate system. A first I/O-related counter corresponds to an x-axis, and a second I/O-related counter corresponds to a y-axis. It is assumed that five two-dimensional data points corresponding to the first I/O-related counter and the second I/O-related counter are collected, where the five two-dimensional data points are respectively a data point (3, 4), a data point (4, 5), a data point (4, 6), a data point (6, 8), and a data point (3, 2). Correspondingly, five pieces of data of the first I/O-related counter are (3, 4, 4, 6, 3), and five pieces of collected data of the second I/O-related counter are (4, 5, 6, 8, 2). Then, the five pieces of data of the first I/O-related counter are averaged to obtain 4, and the five pieces of data of the second I/O-related counter are averaged to obtain 5. Therefore, a coordinate point (4, 5) is the clustering center.

Figure 2:
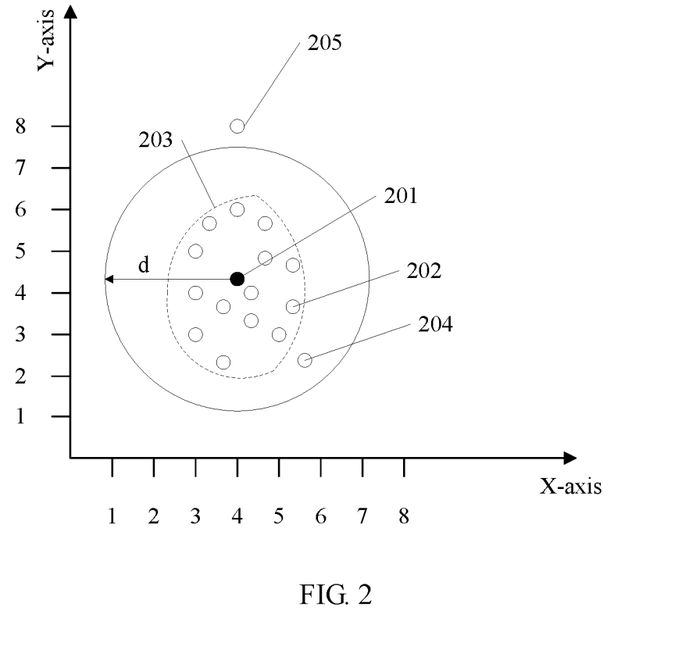
FIG. 2 is a schematic diagram of a specific instance of a clustering center and a predetermined distance according to an embodiment of the present invention.

In practical use, more data points may be collected in step 101. That is, the value of M is greater. In this way, accuracy of subsequent determining may be improved. As shown in FIG. 2, a clustering center 201 is determined in a manner described above, and M data points, such as data points 202 represented by a mark number in FIG. 2, are marked in the two-dimensional coordinate system. A closed boundary 203 may be determined according to distance values from the M data points to the clustering center 201. The boundary 203 may be formed by connecting the outermost data points 202, or may be a circular boundary with a radius being a maximum value among distance values from the data points 202 to the clustering center 201. In practical use, d in FIG. 2 may be used as the predetermined distance, and d enables the probability that the M distance values from the M N-dimensional data points to the clustering center are greater than the predetermined distance to be less than the user acceptable probability range. The M distance values indicate values obtained by mapping the M N-dimensional data points corresponding to the N I/O-related counters onto the N-dimensional coordinate system. The first distance indicates a value obtained by mapping the N pieces of real-time data, as a data point in an N-dimensional coordinate system, onto the N-dimensional coordinate system.

The user acceptable probability range refers to a maximum probability value that is expected by a user and that can be reached by the probability that the M distance values are greater than the predetermined distance, for example, the user acceptable probability range is 5%. In other words, the user expects that at least 95% distance values of the M distance values are less than the predetermined distance. Therefore, from a statistics perspective, the predetermined distance is set to enable the probability that the M distance values are greater than the predetermined distance to be less than the user acceptable probability range. This may be understood as, if the predetermined distance and the first distance are used for comparison, a probability that the first distance is greater than the predetermined distance is less than the user acceptable probability range, that is, is less than an anomaly probability tolerable by the user.

For example, further refer to FIG. 2. It is assumed that a mark number in FIG. 2 indicates a data point 204 formed by using the N pieces of real-time data. Because a distance from the data point 204 to the clustering center 201 is less than d, the first distance does not exceed the predetermined distance. Therefore, the I/O response time is normal. It is assumed that a mark number 205 in FIG. 2 indicates a real-time data point. Because a distance from the real-time data point 205 to the clustering center 201 is greater than d, the first distance exceeds the predetermined distance. Therefore, it is determined that the I/O response time is abnormal.

Specifically, there may also be multiple methods for determining the predetermined distance, and descriptions are made below by giving examples.

A first method is: calculating a mean value and a standard deviation of the M distance values; and determining the predetermined distance according to the mean value and the standard deviation, where the predetermined distance is a sum of the mean value and k times the standard deviation; and a value selecting principle of k is: enabling the probability that the M distance values are greater than the predetermined distance to be less than the user acceptable probability range.

A second method is: calculating a first quantile Q1 and a second quantile Q3 of the M distance values; and determining the predetermined distance according to the first quantile Q1 and the second quantile Q3, where the predetermined distance is $Q3+k*(Q3-Q1)$, and a value selecting principle of k is: enabling the probability that the M distance values are greater than the predetermined distance to be less than the user acceptable probability range.

A third method is: determining the predetermined distance by using the following formula:

$A=k*Z\alpha$, where $\alpha$ is a preset constant greater than 0 and less than 1, $\alpha$ indicates a probability that the M distance values are greater than $Z\alpha$, A is the first distance, and a value selecting principle of k and $\alpha$ is: enabling the probability that the M distance values are greater than the predetermined distance value to be less than the user acceptable probability range.

Therefore, when the first distance from the data point to the clustering center is greater than the predetermined distance, it indicates that the I/O response time is abnormal.

If a manner for processing the M N-dimensional data points is fitting a function, in step 102, N pieces of real-time data of a real-time data point may be substituted into the fitted function, and whether the N pieces of real-time data may accord with the function is determined, so as to determine whether the I/O response time is abnormal.

It can be learned from the foregoing description that, in this embodiment of the present invention, all the N I/O-related counters are processed to obtain a reference value that can be used as a basis, and the real-time data of the N I/O-related counters is processed in the same manner, and then a result obtained by processing the real-time data is compared with the reference value, so as to determine whether the I/O response time is abnormal, which is closer to an actual situation. Therefore, the method in this embodiment of the present invention may be used to reduce false negatives and false positives.

Optionally, after step 102, when the first distance does not exceed the predetermined distance, the the N pieces of real-time data collected in step 101 may be considered as data that is in a normal situation; therefore, clustering processing may be performed again by combining the the N pieces of real-time data and the M N-dimensional data points obtained in the foregoing step, so as to update the clustering center and the predetermined distance. With an increase in updating times, the clustering center and the predetermined distance are more accurate. Therefore, during determining in the subsequent step 102, a determining result is more accurate, and it is not liable to misjudge.

In a third possible implementation manner, a difference from the second possible implementation manner is that, in addition to determining whether a first distance from the data point to a clustering center in the N-dimensional coordinate system is greater than a predetermined distance, step 102 further includes: determining whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range; and if the first distance is greater than the predetermined distance and the real-time data corresponding to the I/O response time exceeds the preset I/O response time threshold, determining that the I/O response time is abnormal.

Therefore, whether the I/O response time is abnormal may be determined by considering both the N I/O-related counters and the I/O response time, so that a determining result is more accurate, thereby further reducing a false negative rate and a false positive rate.

Specifically, the M N-dimensional data points are already collected in the foregoing step, and the M N-dimensional data points are obtained by performing M times of sampling and collecting a set of N pieces of data corresponding to the N I/O-related counters in each time of sampling. Because the N I/O-related counters include the I/O response time, after the M times of sampling, M pieces of data of the I/O response time are obtained. The preset I/O response time threshold is a threshold that enables the probability that the M pieces of data of the I/O response time are greater than the I/O response time threshold to be less than the user acceptable probability range.

In this embodiment, a meaning of the user acceptable probability range is similar to that described above, and details are not described herein.

Manners for determining the I/O response time threshold may include but be not limited to the following manners. A first manner is manual setting. A second manner is: calculating a mean value and a standard deviation of the M pieces of data of the I/O response time; and determining a second anomaly threshold according to the mean value and the standard deviation. For example, the mean value plus a product of the standard deviation and k equals the I/O response time threshold, where a value selecting principle of k is: enabling the probability that the M pieces of data are greater than the I/O response time threshold to be less than the user acceptable probability range. The method is automatically learning the I/O response time threshold by a system without manual setting, and may be self-adaptive to different environment configurations and service scenarios. Further, the learned second anomaly threshold is usually less than a threshold that is manually set in the prior art. Therefore, a slow disk can be discovered earlier, and a service loss can be averted in advance.

In a third manner, the I/O response time threshold may be determined by using the following steps: calculating two quantiles, respectively referred to as a first quantile and a second quantile, according to the M pieces of data corresponding to the I/O response time; and determining the I/O response time threshold according to the first quantile and the second quantile. For example, it is assumed that the first quantile is a 25% quantile and is denoted as Q1, and that the second quantile is a 75% quantile and is denoted as Q2. Then, the I/O response time threshold may be calculated by using the following formula: $Q3+k*(Q3-Q1)$, where a value selecting principle of k is: enabling the probability that the M pieces of data are greater than the I/O response time threshold to be less than the user acceptable probability range. The method is also automatically learning the I/O response time threshold by a system. Calculating the first quantile and the second quantile according to the M pieces of data is content familiar to a person skilled in the art, and details are not described herein.

A fourth manner is determining the I/O response time threshold by using the following formula: $A=k*Z\alpha$, where $\alpha$ is a preset constant greater than 0 and less than 1, $\alpha$ indicates a probability that the M pieces of data are greater than $Z\alpha$, A is the first distance, and a value selecting principle of k and $\alpha$ is: enabling the probability that the M pieces of data are greater than the I/O response time threshold to be less than the user acceptable probability range. Specifically, a value of $Z\alpha$ may be obtained by querying a standard normal distribution table by using $\alpha$, so as to obtain the I/O response time threshold. Certainly, $Z\alpha$ may also be calculated by using $\alpha$.

In a fourth possible implementation manner, a difference from the second possible implementation manner is that, in addition to determining whether a first distance from the data point to a clustering center in the N-dimensional coordinate system is greater than a predetermined distance, step 102 further includes: determining whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance and the real-time data corresponding to the counter that represents a load magnitude is in the preset load range, determining that the I/O response time is abnormal.

Because load affects the I/O response time of the disk, whether the I/O response time is abnormal may be determined by considering both the N I/O-related counters and the load, so that a determining result is more accurate, thereby further reducing false positives and false negatives.

In a specific implementation process, manners for determining the preset load range may include but be not limited to the followings. In a first manner, the preset load range is manually set. In a second manner, because the N I/O-related counters include the counter (such as r/s, w/s, rsec/s, and wsec/s) that represents a load magnitude, M pieces of data of the counter that represents a load magnitude are already collected in the foregoing step, or because the N I/O-related counters do not include the counter that represents a load magnitude, M pieces of data of the counter that represents a load magnitude are additionally collected. A first range between minimum data and maximum data of the M pieces of data may be determined as a preset range. Alternatively, a second range may be determined as the preset range, where the second range is included in the first range. Certainly, the first range is the range between the minimum load and the maximum load that the disk is capable of supporting.

In a fifth possible implementation manner, in this embodiment, whether the I/O response time is abnormal is determined by considering all of three conditions: the N I/O-related counters, the I/O response time, and load, so that a final determining result is more accurate. Specifically, step 102 includes: using the N pieces of real-time data as a data point in an N-dimensional coordinate system, where N dimensions in the N-dimensional coordinate system are in a one-to-one correspondence with the N I/O-related counters; determining whether a first distance from the data point to a clustering center in the N-dimensional coordinate system is greater than a predetermined distance; determining whether real-time data corresponding to the I/O response time exceeds a preset I/O response time threshold; determining whether real-time data corresponding to a counter that represents a load magnitude and that is of the N I/O-related counters exceeds a preset load range; and if the first distance is greater than the predetermined distance, the real-time data corresponding to the I/O response time exceeds the preset I/O response time threshold, and the real-time data corresponding to the counter that represents a load magnitude is in the preset load range, determining that the I/O response time is abnormal.

Manners for determining the preset load range may be the same as the manners described above, meanings of the predetermined distance, the clustering center, and the I/O response time threshold are the same as meanings in the foregoing implementation manners, and details are not described herein.

Specifically, the detection result is output in step 103. For example, the detection result may be output in a manner of log printing, an alarm, interface presentation, or reporting to a processing module, so as to notify the user or the processing module of an occurrence of a slow disk, and the user or the processing module may take a measure such as isolating the disk.

Figure 3:
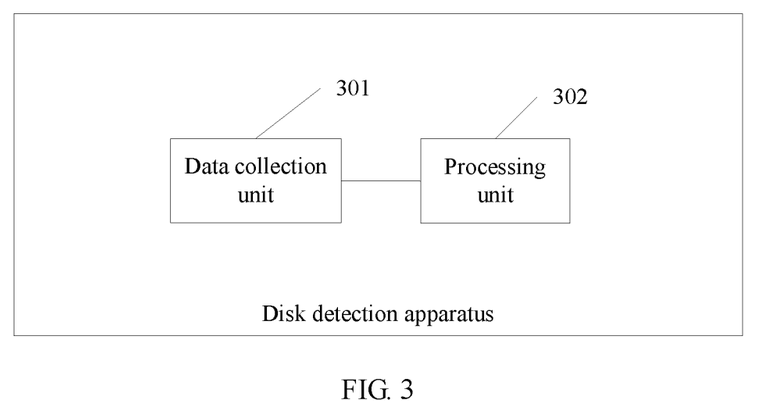
FIG. 3 is a functional block diagram of a disk detection apparatus according to an embodiment of the present invention.

Based on a same invention concept, referring to FIG. 3, FIG. 3 is a functional block diagram of a disk detection apparatus according to an embodiment of this application, and the disk detection apparatus is configured to implement the disk detection method shown in FIG. 1 and FIG. 2 of the present invention. For meanings of terms involved in this embodiment, refer to content described in the foregoing embodiment. The disk detection apparatus includes: a data collection unit 301, configured to collect a set of N pieces of real-time data that are in a one-to-one correspondence with N input/output I/O-related counters of a disk, where the N I/O-related counters include an I/O response time of the disk and a counter affecting the I/O response time; the I/O response time is a time between delivery of an operation request by an application and reception of a response of the disk to the request; and N is an integer greater than or equal to 2; and a processing unit 302, configured to determine, according to the N pieces of real-time data, whether the I/O response time is abnormal, where the I/O response time being abnormal indicates that the disk is incapable of normally running a service, and the I/O response time being normal indicates that the disk is capable of normally running a service; and output a detection result if the I/O response time is abnormal, where the detection result represents that the I/O response time is abnormal.

Optionally, the processing unit 302 is configured to determine which preset interval, of at least two preset intervals of each I/O-related counter of remaining N−1 I/O-related counters other than the I/O response time, that each of N−1 pieces of real-time data corresponding to the remaining N−1 I/O-related counters is in, where the N−1 pieces of real-time data corresponding to the remaining N−1 I/O-related counters are respectively in N−1 preset intervals, and the at least two preset intervals of each I/O-related counter of the N−1 I/O-related counters are at least two subinterval ranges obtained by dividing a large range between a first value and a second value that each I/O-related counter is capable of supporting;

determine whether real-time data corresponding to the I/O response time exceeds an I/O response time threshold corresponding to a combination of the N−1 preset intervals, where the I/O response time threshold is less than or equal to: when the N−1 pieces of real-time data are in respective preset intervals, a maximum I/O response time value that enables the disk to normally run the service; and if the real-time data corresponding to the I/O response time exceeds the I/O response time threshold, determine that the I/O response time is abnormal.

Optionally, the processing unit 302 is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; and if the first distance is greater than the predetermined distance, determine that the I/O response time is abnormal.

Optionally, the processing unit 302 is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; determine whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range; and if the first distance is greater than the predetermined distance and the real-time data corresponding to the I/O response time exceeds the preset I/O response time threshold, determine that the I/O response time is abnormal.

Optionally, the processing unit 302 is configured to use the N pieces of real-time data as a data point in an N-dimensional coordinate system, where N dimensions in the N-dimensional coordinate system are in a one-to-one correspondence with the N I/O-related counters;

determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range;

determine whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance and the real-time data corresponding to the counter that represents a load magnitude is in the preset load range, determine that the I/O response time is abnormal.

Optionally, the processing unit 302 is configured to use the N pieces of real-time data as a data point in an N-dimensional coordinate system, where N dimensions in the N-dimensional coordinate system are in a one-to-one correspondence with the N I/O-related counters;

determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range;

determine whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range;

determine whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance, the real-time data corresponding to the I/O response time exceeds the preset I/O response time threshold, and the real-time data corresponding to the counter that represents a load magnitude is in the preset load range, determine that the I/O response time is abnormal.

Various variation manners and specific instances of the disk detection method in the foregoing embodiment of FIG. 1 and FIG. 2 are also applicable to the disk detection apparatus in this embodiment. By means of the foregoing detailed description on the disk detection method, a person skilled in the art can clearly know an implementation method of the disk detection apparatus in this embodiment, and for brevity in this specification, details are not described herein.

Figure 4:
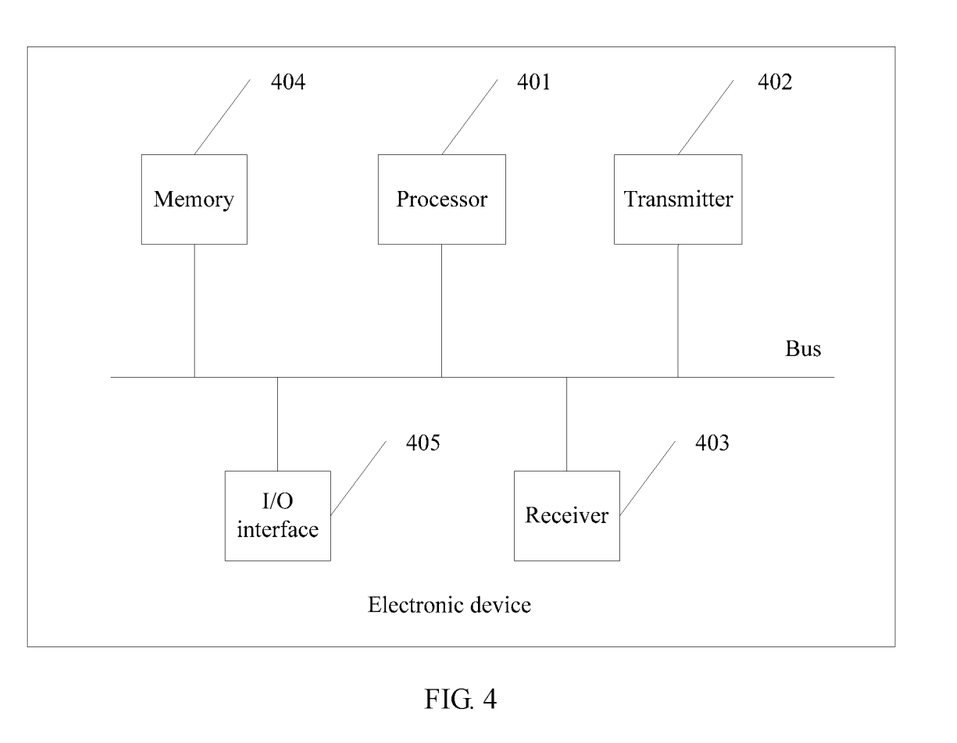
FIG. 4 is a structural block diagram of an electronic device according to an embodiment of the present invention.

Based on a same invention concept, referring to FIG. 4, FIG. 4 is a structural block diagram of an electronic device according to an embodiment of this application, and the electronic device is configured to implement the disk detection method shown in FIG. 1 and FIG. 2 of the present invention. For meanings of terms involved in this embodiment, refer to content described in the foregoing embodiment. The electronic device includes: a processor 401, a transmitter 402, a receiver 403, a memory 404, and an I/O interface 405. The processor 401 may be specifically a general central processing unit (CPU), an application specific integrated circuit (Application Specific Integrated Circuit, ASIC for short), or one or more integrated circuits for controlling program execution. There may be one or more memories 404. The memory 404, the receiver 403, and the transmitter 402 are connected to the processor 401 by using a bus. The receiver 403 and the transmitter 402 are configured to perform network communication with an external device, and specifically, may communicate with an external device by using a network such as an Ethernet network, a radio access network, or a wireless local area network. The receiver 403 and the transmitter 402 may be two physically independent elements, or a same element from a physical perspective. The I/O interface 405 may be configured to connect to a peripheral such as a mouse or a keyboard.

Specifically, a disk is mounted in the electronic device, or the electronic device is connected to a disk, such as a hard disk, a USB flash drive, or a disk array.

Specifically, the electronic device may be a user-side device, or a network-side device.

Specifically, the memory 404 is configured to store data used by the processor 401.

The processor 401 is configured to collect a set of N pieces of real-time data that are in a one-to-one correspondence with N input/output I/O-related counters of a disk, where the N I/O-related counters include an I/O response time of the disk and a counter affecting the I/O response time; the I/O response time is a time between delivery of an operation request by an application and reception of a response of the disk to the request; and N is an integer greater than or equal to 2.

The processor 401 is further configured to determine, according to the N pieces of real-time data, whether the I/O response time is abnormal, where the I/O response time being abnormal indicates that the disk is incapable of normally running a service, and the I/O response time being normal indicates that the disk is capable of normally running a service; and output a detection result if the I/O response time is abnormal, where the detection result represents that the I/O response time is abnormal.

Optionally, the processor 401 is configured to determine which preset interval, of at least two preset intervals of each I/O-related counter of remaining N−1 I/O-related counters other than the I/O response time, that each of N−1 pieces of real-time data corresponding to the remaining N−1 I/O-related counters is in, where the N−1 pieces of real-time data corresponding to the remaining N−1 I/O-related counters are respectively in N−1 preset intervals, and the at least two preset intervals of each I/O-related counter of the N−1 I/O-related counters are at least two subinterval ranges obtained by dividing a large range between a first value and a second value that each I/O-related counter is capable of supporting;

determine whether real-time data corresponding to the I/O response time exceeds an I/O response time threshold corresponding to a combination of the N−1 preset intervals, where the I/O response time threshold is less than or equal to: when the N−1 pieces of real-time data are in respective preset intervals, a maximum I/O response time value that enables the disk to normally run the service; and if the real-time data corresponding to the I/O response time exceeds the I/O response time threshold, determine that the I/O response time is abnormal.

Optionally, the processor 401 is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; and if the first distance is greater than the predetermined distance, determine that the I/O response time is abnormal.

Optionally, the processor 401 is configured to use the N pieces of real-time data as a data point in an N-dimensional coordinate system, where N dimensions in the N-dimensional coordinate system are in a one-to-one correspondence with the N I/O-related counters; determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range; determine whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range; and if the first distance is greater than the predetermined distance and the real-time data corresponding to the I/O response time exceeds the preset I/O response time threshold, determine that the I/O response time is abnormal.

Optionally, the processor 401 is configured to use the N pieces of real-time data as a data point in an N-dimensional coordinate system, where N dimensions in the N-dimensional coordinate system are in a one-to-one correspondence with the N I/O-related counters;

determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range;

determine whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance and the real-time data corresponding to the counter that represents a load magnitude is in the preset load range, determine that the I/O response time is abnormal.

Optionally, the processor 401 is configured to use the N pieces of real-time data as a data point in an N-dimensional coordinate system, where N dimensions in the N-dimensional coordinate system are in a one-to-one correspondence with the N I/O-related counters;

determine whether a first distance from the data point to a clustering center in the N-dimensional coordinate system is greater than a predetermined distance, where the clustering center is a central point obtained by performing clustering processing on M N-dimensional data points that correspond to the N I/O-related counters and that are collected before the N pieces of real-time data are collected, and the predetermined distance is a distance that enables a probability that M distance values from the M N-dimensional data points to the clustering center are greater than the predetermined distance to be less than a user acceptable probability range;

determine whether real-time data corresponding to the I/O response time exceeds a preset I/O response time threshold, where the I/O response time threshold is a threshold that enables a probability that M pieces of data that correspond to the I/O response time and that are of the M N-dimensional data points are greater than the I/O response time threshold to be less than a user acceptable probability range;

determine whether real-time data corresponding to a counter that represents a load magnitude and that is of the N I/O-related counters exceeds a preset load range, where the preset load range is a full range or a partial range of a range between minimum load and maximum load that the disk is capable of supporting; and if the first distance is greater than the predetermined distance, the real-time data corresponding to the I/O response time exceeds the preset I/O response time threshold, and the real-time data corresponding to the counter that represents a load magnitude is in the preset load range, determine that the I/O response time is abnormal.

Various variation manners and specific instances of the disk detection method in the foregoing embodiment of FIG. 1 and FIG. 2 are also applicable to the electronic device in this embodiment. By means of the foregoing detailed description on the disk detection method, a person skilled in the art can clearly know an implementation method of the electronic device in this embodiment, and for brevity in this specification, details are not described herein.

Based on a same invention concept, an embodiment of the present invention further provides a disk system, including a disk and a disk controller. The disk controller is configured to execute the foregoing method described in FIG. 1 and the embodiment of FIG. 1. For details, refer to the foregoing description on FIG. 1 and the embodiment of FIG. 1, and the details are not described herein.

Further, an embodiment of the present invention further provides an electronic device. For a structure of the electronic device, refer to FIG. 4. A difference lies in that the electronic device in this embodiment further includes the disk system.

The one or more technical solutions provided in the embodiments of the present invention have at least the following technical effects or advantages:

In the embodiments of the present invention, real-time data of an I/O response time of a disk and real-time data of a counter affecting the I/O response time are collected, and then whether the I/O response time is abnormal is determined according to real-time data of multiple counters, so as to detect whether a slow disk occurs. Further, according to the embodiments of the present invention, whether the I/O response time is abnormal is determined by further referring to another I/O counter affecting the I/O response time, and therefore is closer to an actual situation. Therefore, a detection result of the method in the embodiments of the present invention is relatively accurate, thereby reducing false negatives and false positives.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the scope of the present invention. The present invention is intended to cover these modifications and variations provided that they fall within the scope of protection defined by the following claims and their equivalent technologies.

What is claimed is:
1. A disk detection method, comprising:
collecting a set of N pieces of real-time data that are in a one-to-one correspondence with N I/O-related counters of a disk, wherein
the N I/O-related counters comprise an I/O response time of the disk and a counter affecting the I/O response time, the I/O response time being a time between delivery of an operation request by an application and reception of a response of the disk to the request; and N is an integer greater than or equal to 2;

determining, according to the N pieces of real-time data, whether the I/O response time is abnormal, wherein the I/O response time being abnormal indicates that the disk is incapable of normally running a service, and the I/O response time being normal indicates that the disk is capable of normally running a service; and outputting a detection result if the I/O response time is abnormal, wherein the detection result represents that the I/O response time is abnormal; and, wherein determining, according to the N pieces of real-time data, whether the I/O response time is abnormal comprises:

determining, from at least two preset intervals of each I/O-related counter of remaining N−1 I/O-related counters other than the I/O response time counter, a preset interval that each of N−1 pieces of real-time data corresponding to the remaining N−1 I/O-related counters is in, wherein the N−1 pieces of real-time data corresponding to the remaining N−1 I/O-related counters are respectively in N−1 preset intervals, and the at least two preset intervals of each I/O-related counter of the N−1 I/O-related counters are at least two subinterval ranges obtained by dividing a large range between a first value and a second value, the first value and the second value that each of the N−1 I/O-related counters is capable of supporting;

determining whether real-time data corresponding to the I/O response time exceeds an I/O response time threshold corresponding to a combination of the N−1 preset intervals, wherein the I/O response time threshold is less than or equal to a maximum I/O response time value that enables the disk to normally run the service, when the N−1 pieces of real-time data are in respective preset intervals; and if the real-time data corresponding to the I/O response time exceeds the I/O response time threshold, determining that the I/O response time is abnormal.

2. A disk detection apparatus, comprising:

a data collection unit, configured to collect a set of N pieces of real-time data that are in a one-to-one correspondence with N input/output I/O-related counters of a disk, wherein the N I/O-related counters comprise an I/O response time of the disk and a counter affecting the I/O response time;

the I/O response time is a time between delivery of an operation request by an application and reception of a response of the disk to the request; and N is an integer greater than or equal to 2; and a processing unit, configured to determine, according to the N pieces of real-time data, whether the I/O response time is abnormal, wherein the I/O response time being abnormal indicates that the disk is incapable of normally running a service, and the I/O response time being normal indicates that the disk is capable of normally running a service; and output a detection result if the I/O response time is abnormal, wherein the detection result represents that the I/O response time is abnormal; and wherein the processing unit is configured to determine, from at least two preset intervals of each I/O-related counter of remaining N−1 I/O-related counters other than the I/O response time counter, a preset interval that each of N−1 pieces of real-time data corresponding to the remaining N−1 I/O-related counters is in, wherein the N−1 pieces of real-time data corresponding to the remaining N−1 I/O-related counters are respectively in N−1 preset intervals, and the at least two preset intervals of each I/O-related counter of the N−1 I/O-related counters are at least two subinterval ranges obtained by dividing a large range between a first value and a second value, the first value and the second value that each of the N−1 I/O-related counters is capable of supporting;

determine whether real-time data corresponding to the I/O response time exceeds an I/O response time threshold corresponding to a combination of the N−1 preset intervals, wherein the I/O response time threshold is less than or equal to a maximum I/O response time value that enables the disk to normally run the service, when the N−1 pieces of real-time data are in respective preset intervals; and if the real-time data corresponding to the I/O response time exceeds the I/O response time threshold, determine that the I/O response time is abnormal.

3. An electronic device, comprising:

a memory, configured to store data used by a processor; and the processor, configured to collect a set of N pieces of real-time data that are in a one-to-one correspondence with N I/O-related counters of a disk, wherein the N I/O-related counters comprise an I/O response time of the disk and a counter affecting the I/O response time, the I/O response time being a time between delivery of an operation request by an application and reception of a response of the disk to the request;

and N is an integer greater than or equal to 2, wherein the processor is further configured to determine, according to the N pieces of real-time data, whether the I/O response time is abnormal, wherein the I/O response time being abnormal indicates that the disk is incapable of normally running a service, and the I/O response time being normal indicates that the disk is capable of normally running a service; and output a detection result if the I/O response time is abnormal, wherein the detection result represents that the I/O response time is abnormal;

wherein the processor is configured to determine, from at least two preset intervals of each I/O-related counter of remaining N−1 I/O-related counters other than the I/O response time counter, a preset interval that each of N−1 pieces of real-time data corresponding to the remaining N−1 I/O-related counters is in, wherein the N−1 pieces of real-time data corresponding to the remaining N−1 I/O-related counters are respectively in N−1 preset intervals, and the at least two preset intervals of each I/O-related counter of the N−1 I/O-related counters are at least two subinterval ranges obtained by dividing a large range between a first value and a second value, the first value and the second value that each of the N−1 I/O-related counters is capable of supporting;

determine whether real-time data corresponding to the I/O response time exceeds an I/O response time threshold corresponding to a combination of the N−1 preset intervals, wherein the I/O response time threshold is less than or equal to a maximum I/O response time value that enables the disk to normally run the service, when the N−1 pieces of real-time data are in respective preset intervals; and if the real-time data corresponding to the I/O response time exceeds the I/O response time threshold, determine that the I/O response time is abnormal.

4. A disk system, comprising:

a disk; and a disk controller, configured to collect a set of N pieces of real-time data that are in a one-to-one correspondence with N I/O-related counters of the disk, wherein the N I/O-related counters comprise an I/O response time of the disk and a counter affecting the I/O response time, the I/O response time being a time between delivery of an operation request by an application and reception of a response of the disk to the request; and N is an integer greater than or equal to 2, wherein the disk controller is further configured to determine, according to the N pieces of real-time data, whether the I/O response time is abnormal, wherein the I/O response time being abnormal indicates that the disk is incapable of normally running a service, and the I/O response time being normal indicates that the disk is capable of normally running a service; and output a detection result if the I/O response time is abnormal, wherein the detection result represents that the I/O response time is abnormal; and wherein the disk controller is configured to determine, form at least two preset intervals of each I/O-related counter of remaining N−1 I/O-related counters other than the I/O response time counter, a preset interval that each of N−1 pieces of real-time data corresponding to the remaining N−1 I/O-related counters is in, wherein the N−1 pieces of real-time data corresponding to the remaining N−1 I/O-related counters are respectively in N−1 preset intervals, and the at least two preset intervals of each I/O-related counter of the N−1 I/O-related counters are at least two subinterval ranges obtained by dividing a large range between a first value and a second value, the first value and the second value that each of the N−1 I/O-related counters is capable of supporting;

determine whether real-time data corresponding to the I/O response time exceeds an I/O response time threshold corresponding to a combination of the N−1 preset intervals, wherein the I/O response time threshold is less than or equal to a maximum I/O response time value that enables the disk to normally run the service, when the N−1 pieces of real-time data are in respective preset intervals; and if the real-time data corresponding to the I/O response time exceeds the I/O response time threshold, determine that the I/O response time is abnormal.

* * * * *

UNITED STATES PATENT AND TRADEMARK OFFICE
CERTIFICATE OF CORRECTION

PATENT NO. : 10,768,826 B2  
APPLICATION NO. : 15/883029  
DATED : September 8, 2020  
INVENTOR(S) : Jinghui Li et al.

Page 1 of 1

It is certified that error appears in the above-identified patent and that said Letters Patent is hereby corrected as shown below:

In the Claims

Column 30, Line 2, please delete "form" and insert --from-- before "at least".

Signed and Sealed this
Twentieth Day of April, 2021

Drew Hirshfeld
*Performing the Functions and Duties of the
Under Secretary of Commerce for Intellectual Property and
Director of the United States Patent and Trademark Office*